Jan. 14, 1958 K. R. DENNICK 2,819,844
TEMPERATURE AND RELATIVE HUMIDITY CONTROLLER
DEVICE FOR AIR CONDITIONING APPARATUS
Filed April 26, 1956 4 Sheets-Sheet 1
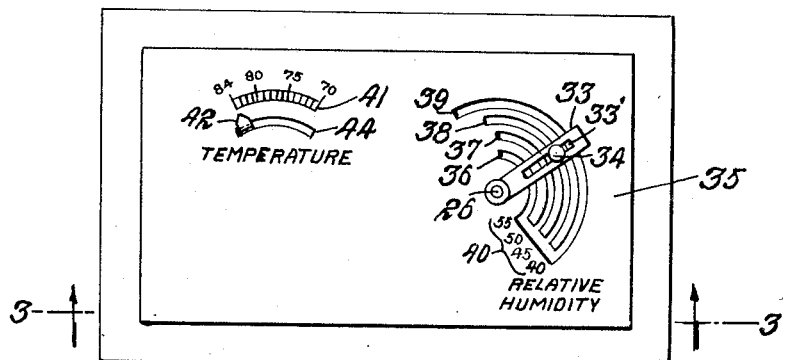
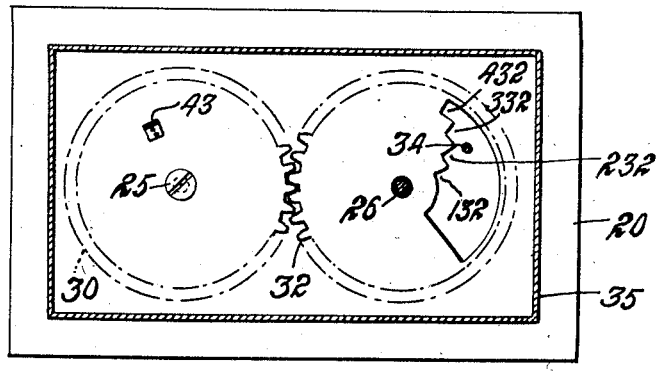
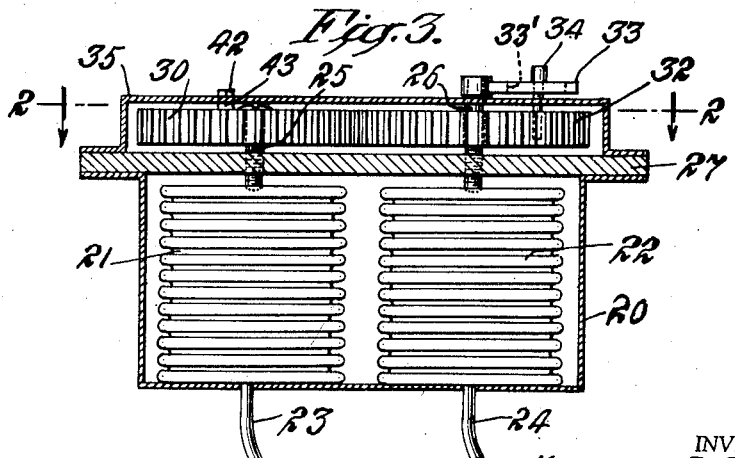
INVENTOR.
KENNETH R. DENNICK
BY
ATTORNEY

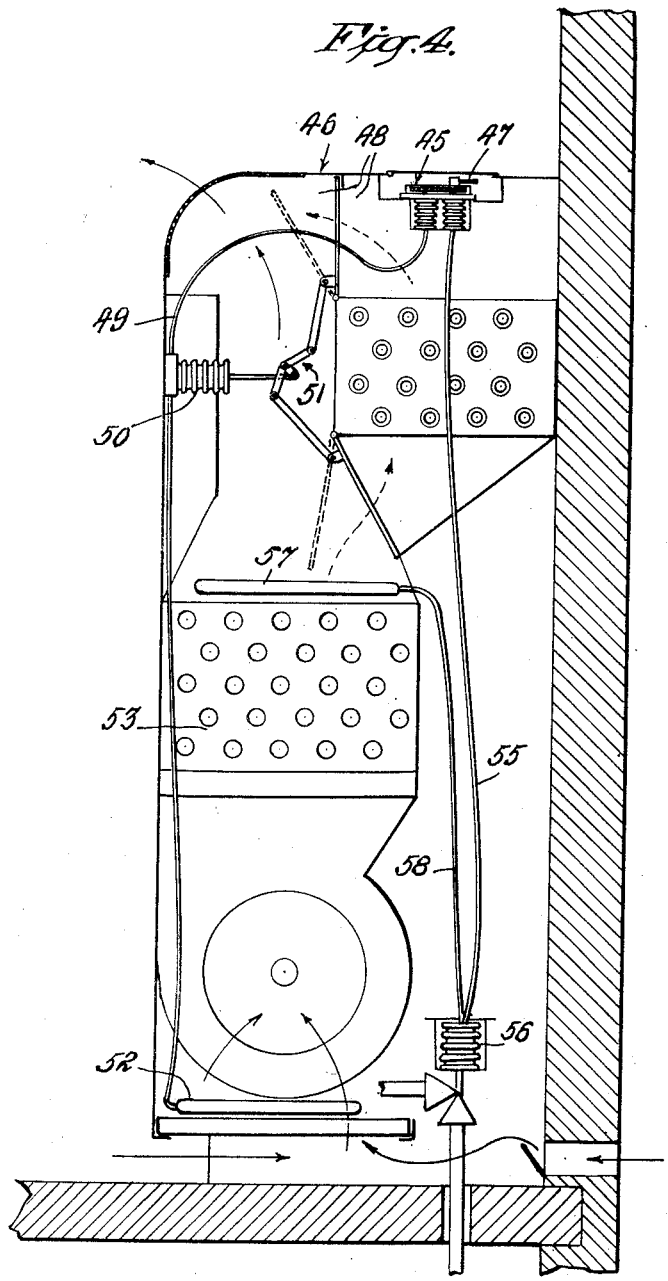

Jan. 14, 1958
K. R. DENNICK
2,819,844
TEMPERATURE AND RELATIVE HUMIDITY CONTROLLER
DEVICE FOR AIR CONDITIONING APPARATUS
Filed April 26, 1956
4 Sheets-Sheet 3
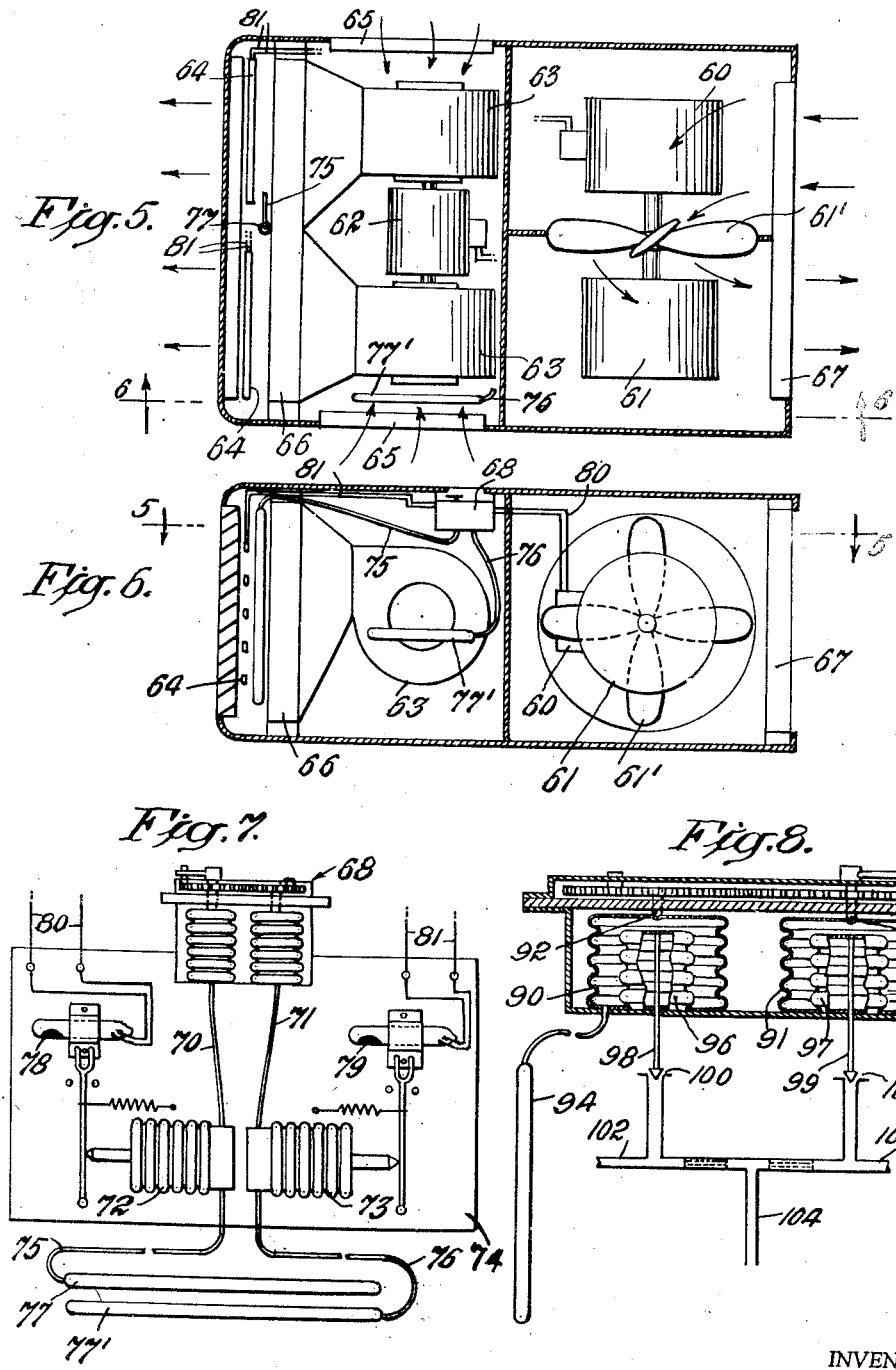
INVENTOR.
KENNETH R. DENNICK
BY
ATTORNEY

INVENTOR.
KENNETH R. DENNICK
BY
ATTORNEY

United States Patent Office 2,819,844
Patented Jan. 14, 1958

2,819,844

TEMPERATURE AND RELATIVE HUMIDITY CONTROLLER DEVICE FOR AIR CONDITIONING APPARATUS

Kenneth R. Dennick, New York, N. Y.

Application April 26, 1956, Serial No. 580,780

3 Claims. (Cl. 236—44)

The invention relates to a setting and controller device for use with air conditioners and embodying manually actuable means whereby the same may, within the range for which the conditioner unit is designed, be adjusted for control of the said unit to provide desired relationships between the temperature and relative humidity of the ambient atmosphere.

It has for an object to provide a relatively simple device for this purpose and one which lends itself for convenient setting by means of an operating member or handle.

A further object of the invention is to provide a device of the aforesaid nature which is suitable, with the addition of a reheater, for association with refrigeration systems of either the absorption or the compression type.

Another object of the invention is to control both temperature and relative humidity with dry type bulb influenced control elements, thereby obviating the objections attendant in the use of wet bulbs or moisture sensitive elements.

Still another object of the invention is to provide means for readily selecting the desired one of a number of predetermined conditions of temperature and relative humidity; and, with respect to the latter, that the same may not rise above the range selected.

In carrying out the invention, provision is made to combine the regulation of temperature controlling means and dew point controlling means in a unified control device having a single manually operable selector member, and whereby the respective controlling means influence the conditioning system.

The arrangement is such, moreover, that any one of a number of predetermined relative humidity conditions may be selected; and, with the particular selected one, the device is operable to secure over a predetermined range also a selected temperature (dry bulb) condition at the desired relative humidity.

In the accompanying drawings,

Fig. 1 is a plan view of the novel setting and controller device.

Fig. 2 is a horizontal section therethrough, taken on the line 2—2, Fig. 3 and looking in the direction of the arrows.

Fig. 3 is a longitudinal section thereof, taken on the line 3—3, Fig. 1, looking in the direction of the arrows.

Fig. 4 is a more or less fragmentary view, and partly in vertical section, of an air conditioner unit of the absorption type having the novel setting and controller device applied.

Fig. 5 is a horizontal section and Fig. 6 a vertical section, taken respectively on the line 5—5, Fig. 6 and the line 6—6, Fig. 5, looking in the direction of the arrows; and illustrate the application of the novel setting and controller device to a compression type of conditioner unit.

Fig. 7 is a detail view of the controller panel and electrical operating circuits associated therewith, as applied in the embodiment shown in Figs. 5 and 6.

Fig. 8 is a similar view illustrating a pneumatic system of operation with the novel device.

Figure 9:
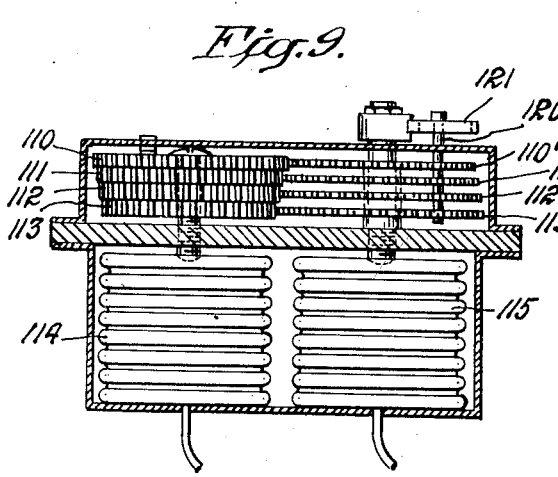
Fig. 9 illustrates a modification in the device.
Figure 12:
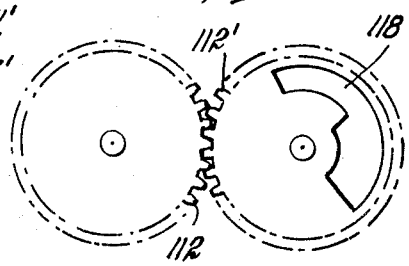
Figs. 10, 11, 12 and 13 are horizontal sections taken respectively through different pairs of mating gears of the device shown in Fig. 9; and illustrate the characteristics of corresponding slots provided in a mating gear thereof.
Figure 10:
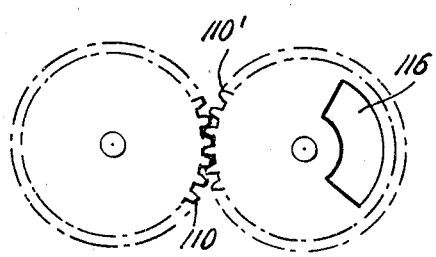
Figure 13:
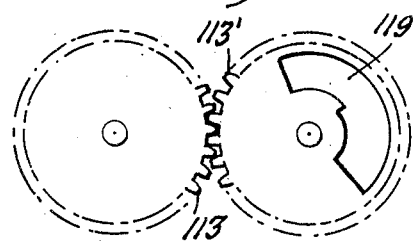
Figure 11:
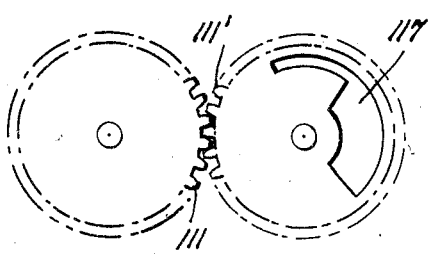

Referring to the drawings, 20 designates a housing or instrument panel wherein is mounted a pair of regulator members comprising, for example, the bellows-like extensible and compressible elements 21, 22 having at their lower ends flexible capillary tubes 23, 24 adapted to connect them to temperature sensing and regulator members of an air conditioner unit of the absorption or compressor type, as is hereinafter set forth. To expand or contract the volume of said bellows 21, 22 respective screws 25, 26 rotatably contact at their respective inner ends the tops of the elements and are adapted to rotate coaxially in the longitudinal axis of a said element. The screws are threaded, also, through a fixed plate or bar 27. One of the screws, as the screw 25, is fixedly secured to the center of a spur gear 30, as through its head which is grooved for initial adjustment of the screw with respect to the gear.

The other of the screws passes axially through a spur gear 32 but is not connected directly thereto as is the case of screw 25, passing instead freely through said gear 32. It is, however, threaded through the bar 27 and has fixed to its outer end and actuating member such as the handle element 33.

The two gears 30, 32 are meshed, as shown, so that in turning of the latter rotation of the other gear will be effected. To this end, the handle element 33 carries a pin 34 which extends downwardly and parallel to the screw 26 and into a series of cut-through portions 132, 232, 332, 432 of the gear body for selection of the desired one. Such selection is determined by the radial position of the pin along the handle element—for the purpose hereinafter set forth; and the same is secured by providing the handle element 33 with a longitudinal slot 33′ to accommodate the adjustment.

A cover plate 35 is provided over the gears, and the shank of screw 26 extends through the cover plate with handle element attached thereto externally of the housing. Arcuate slots 36, 37, 38, 39 are provided in the cover plate to suit the different pin positions radially and to determine the extent of circular adjustment of the gear. Graduations 40 are juxtaposed to the respective slots and in the arrangement described are representative of relative humidity ranges to be secured by a selected adjustment.

Similarly, indications are afforded, as at the scale 41, for dry bulb temperatures, said scale being to this end associated with a pointer 42 carried by the gear 30, the shaft 43 of said pointer likewise extending through a slot 44 in the cover plate.

As is indicated in Fig. 4, a controller unit 45 of the aforesaid nature is associated with the conditioner unit 46 so as to be conveniently accessible for manual actuation of its handle member 47. For example, it may be secured to the wall of the dual outlet duct 48 of said conditioner unit. The latter is of the absorption type such as is set forth more particularly in my U. S. Letters Patent #2,721,449; and the control capillary tube 49 from said controller unit connects then the damper control means (bellows 50) of the lever arrangement 51 disclosed and which regulates the degree of reheat to be added to the air conditioned by the unit. In addition, the control means 50 is subject to regulation by a dry bulb 52 which is associated with the ambient air in advance of the evaporator 53 of the conditioner unit, being located in the circulating air stream at the air inlet. In like manner, the controller unit 45 controls through the capillary tube 55 a further control means 56 which regulates the steam supply to the generator (not shown). This control is also subject to the influence of dew-point temperature, as by the bulb 57, connected thereto by capillary tube 58, which is located beyond the evaporator 53.

However, it is to be understood that the application of the novel controller device is not confined to systems of the absorption type. It is equally applicable to compressor type systems; and, referring to Figs. 5 and 6 of the drawings, in which such a system suitable for window or console conditioners is set forth, 60 designates an electric motor for driving the compressor 61 and fan 61', and a further motor 62 drives the fans 63. An electric reheater 64 is provided beyond said fans for the conditioned air, air being introduced initially through inlets 65. The evaporator is indicated at 66 and the condenser at 67, while the controller unit 68 is mounted conveniently for manual operation on the unit, as shown in Fig. 8.

It is preferred in connection with the compressor system described to modify somewhat the arrangement of control to this end, reference being had to Fig. 7 of the drawings, the capillary tubes 70 and 71 extend only to further bellows elements 72, 73 respectively, which are mounted on the same panel 74 that carries the controller unit 68. These elements 72, 73 are under the influence—through corresponding connecting capillary tubes 75, 76—of a bulb 77 and a bulb 77', respectively (Fig. 6). The bellows elements 72, 73 as thus influenced operate in well known manner electric contact means such as, for example, the mercury switches 78, 79 respectively. These may be mounted on the panel 74, and the pairs of leads 80, 81 extending therefrom are to be connected respectively to the compressor motor 60 and to the electric reheater 64, whereby the values of temperature and relative humidity, as selected by manual adjustment of the controller 68, are maintained.

A pneumatic control arrangement is also feasible for regulation of the novel control unit, as is indicated in Fig. 8. The bellows elements 90, 91 in this instance are of the differential type. Thus, the action of one of the screws 92, 93 on the other of the bellows-like elements is influenced by the dry bulb 94 as affected by entering air. The action of the other element is also influenced similarly by the dew point bulb 95. The transmitting elements 96, 97 of the respective bellows elements, which include corresponding rods 98, 99 have conical ends to afford bleed valves 100, 101 designed to bleed air from respective conduits 102, 103 connected to a source of compressed air supply, indicated by the pipe 104, to control the reheat means (not shown) and the control air supply to the compressor (not shown) or its expansion valve (not shown), as is well understood.

Figure 14:
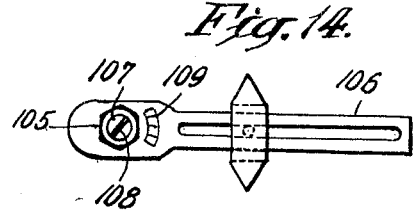
Fig. 14 is a plan view of a modified construction of the handle assembly.
Figure 15:
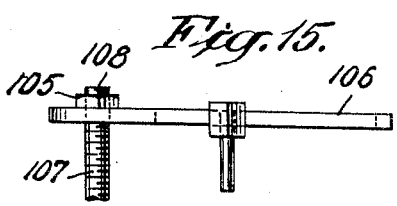
Fig. 15 is an elevation thereof.

While the hereinbefore described control does not incorporate features which are subject to varying room humidity loads, adjustment for known or anticipated continual latent loads are possible, as in providing adjustment of the bellows controlling the refrigeration cycle with respect to its normally attached handle member. Thus, reference being had to Figs. 14 and 15 of the drawings, the lock nut 105 for securing the handle 106 to the setting means 107 is loosened and the screw given the desired turn with a screw driver (not shown) inserted in the groove 108 of said screw. For example, a turn of one degree, as determined by reference to the scale 109 on the surface of the handle member, may cause reduction of one degree F. in the dew point setting of the refrigeration cycle which is equivalent to a reduction of approximately 0.0003 pound of moisture per pound of air handled. The lock nut is then caused to lock the handle and screw together, it being understood that the latter is firmly held in both operations.

In all of the various embodiments, the action of their meshing gears in affording the desired setting involves the novel arrangement for imparting to the gear associated with the handle member an angular displacement such as to vary the effective volume of the other bellows element. This displacement is calculated with reference to the desired relative humidity and temperature conditions, as will hereinafter be more fully set forth; and the cut-out portions of the actuating gear subtending the necessary arcs. These are located radially with respect to one another and register with the slots of the cover plate which insure correct positioning of the radially displaceable pin of the handle member in the said cut-out portions. It will be appreciated that movement of the pin in a particular slot, as set for a desired relative humidity value, will be ineffective with respect to effecting an adjustment of the temperature desired until the corresponding shoulder of the cut-out portion is contacted by the pin. That is to say, the gear with the cut-out portion is not rotated until the aforesaid contact occurs; and such rotation will then be imparted to the other and meshing gear to set the temperature desired in relation to the humidity condition selected, which temperature may be displayed at the scale.

It will be apparent that this relationship, in view of the use of but a single set of gears for a plurality of ranges of the selected humidity conditions, will not conform exactly to the calculated relationships for the respective conditions, but will result in minor errors—although for many purposes it will be sufficiently close. However, by constructing the gearing system, in the manner disclosed in Fig. 9, with an independent pair of meshing gears for each relative humidity range, a substantially accurate adjustment becomes possible.

Thus, the gearing shown in Fig. 9 comprises four sets of meshing gears: 110—110', 111—111', 112—112' and 113—113' for actuating the bellows 114 and 115. The cut-out portions 116, 117, 118 and 119 for receiving the gear-actuating pin 120 carried by handle member 121 then increases accordingly in width, as shown. By this expedient, a close approximation to theoretical psychromatic standards is attained.

The aforesaid displacements of the respective gear or gears, as the case may be, is such that the particular dew point regulator member (refrigeration cycle) operates freely from off position to the upper dew point for dry bulb setting for each relative humidity range. At such point the pin engages its gear and, upon further movement of the handle, will rotate said gear which results in rotation of the companion gear controlling the reheat adjustment through the other regulator member.

In determining such displacements, the relative humidity range within which the conditioner unit (controller) is to operate, there is selected, for example, the values of 40, 45, 50 and 55 percent relative humidity, as desired. These selected values represent the maximum moisture content to be maintained, but it will be appreciated that such content may fall below the same due to atmospheric humidity conditions, but can never attain a higher value.

Similarly, for temperatures, the selected range of the dry bulb values, within which the conditioner operates, is selected, for example, over a range of 70°–84° F.

Thus in determining the said displacements, the relative humidity range within which the unit is to operate is selected, as aforesaid; and for each of these relative humidity ranges the dew point temperatures are calculated for the respective minimum and maximum dry bulb temperatures. For example, the dew point temperatures for the dry bulb temperatures and relative humidities aforesaid are as follows:

| Dry Bulb Temperatures, Degrees F. | Relative Humidity | | | |
|---|---|---|---|---|
| | 40% | 45% | 50% | 55% |
| | Dew Point Temperature, degrees | | | |
| 84 | 57.78 | 61.00 | 63.96 | 66.62 |
| 70 | 44.99 | 48.07 | 50.86 | 53.41 |

Deducting the minimum dew point temperature from the maximum dew point temperature in each relative humidity range, the following values are obtained:

| Difference, degrees | 12.79 | 12.93 | 13.10 | 13.21 |
|---|---|---|---|---|

These differences, used in conjunction with the minimum-maximum dry bulb temperature difference (14°) determine the gear ratios required to arrive at accurate conditions.

For all practical purposes, the dew point temperature differences may be averaged, which figure (13.007°) when used with the dry bulb difference, gives a gear ratio of 13.007 to 14. This averaging set-up results in the following minimum and maximum temperatures (dry bulb) after reheat:

| | Relative Humidity | | | |
|---|---|---|---|---|
| | 40% | 45% | 50% | 55% |
| Maximum, degrees | 84.11 | 84.04 | 83.95 | 83.89 |
| Minimum, degrees | 69.89 | 69.96 | 70.05 | 70.11 | which are practical approximations.

I claim:

1. A combined temperature and relative humidity setting and controller device for use with air conditioners in the selection and maintenance thereby of the desired temperature and relative humidity conditions, said device comprising a pair of pressure-responsive regulator members; a pair of screws respectively bearing thereon for setting the members; a pair of interconnected rotatable means associated respectively with the pair of setting screws, one means being rotatable with its setting screw; and an actuating member associated with the other setting screw for rotation thereof and including a selector element radially adjustable along said actuating member, extending through the other of the interconnected rotatable means parallel to its axis of rotation, and adapted at selected angular positions along the actuating member for engagement with said other of the interconnected rotatable means to effect its rotation.

2. The setting and controller device according to claim 1, wherein the interconnected rotatable means comprise a pair of meshing spur gears, the one gear being rotatable with its setting screw and the other gear being provided with a plurality of arcuate, communicating through-openings of different lengths to accommodate the selector element radial adjustments.

3. The setting and controller device according to claim 2, wherein a housing is provided for the pressure-responsive means and meshing spur gears, and a cover plate closed the housing, said plate having a series of parallel slots therein arcuate with respect to the axis of rotation of said other gear, all slots merging at one end into a common radial slot and said arcuate slots being of different lengths in conformity with the through-openings of said other gear and registering therewith.

References Cited in the file of this patent

UNITED STATES PATENTS

| Re. 21,166 | Beals | Aug. 1, 1939 |
| 1,988,776 | Berghoefer | Jan. 22, 1935 |
| 2,190,344 | Woodling | Feb. 13, 1940 |